United States Patent [19]

Stiglich

[11] Patent Number: 4,671,172
[45] Date of Patent: Jun. 9, 1987

[54] APPARATUS FOR MIXING FOOD INGREDIENTS

[76] Inventor: Nicholas M. Stiglich, 215 8th St., Cresskill, N.J. 07626

[21] Appl. No.: 855,740

[22] Filed: Apr. 25, 1986

[51] Int. Cl.⁴ .............................................. A23G 9/00
[52] U.S. Cl. ...................................... 99/460; 99/452; 366/197; 366/318; 366/347
[58] Field of Search .......................... 99/452, 453–455, 99/460, 466, 348, 494, 516, 517; 366/140, 144, 149, 197, 194–196, 199, 206, 247, 279, 318, 323, 347; 241/282.1; 426/518, 519; 425/206, 135, 182; 222/413

[56] References Cited

U.S. PATENT DOCUMENTS

| | | | |
|---|---|---|---|
| 2,409,067 | 10/1946 | Reed | 366/140 X |
| 2,626,132 | 1/1953 | Reed | 366/323 |
| 2,626,133 | 1/1953 | Reed | 425/206 X |
| 4,448,114 | 5/1954 | Mayer | 99/348 X |
| 4,502,377 | 3/1985 | Hall, Jr. | 99/492 |
| 4,548,508 | 10/1985 | Verkler | 366/318 X |
| 4,590,852 | 5/1986 | Mayer et al. | 99/452 X |

*Primary Examiner*—Timothy F. Simone
*Attorney, Agent, or Firm*—Anthony F. Cuoco

[57] ABSTRACT

Apparatus for mixing food ingredients is disclosed including a cabinet for supporting a mixer for the ingredients. A frame is arranged within the cabinet for being raised and lowered relative thereto. The frame supports a plate having a through hole for receiving the mixer and a movable tray for supporting a container for the ingredients. The tray is moved under the plate and the frame is raised by a weight arrangement, whereby the mixer engages the container and is actuated for mixing the ingredients therein.

9 Claims, 3 Drawing Figures

APPARATUS FOR MIXING FOOD INGREDIENTS

BACKGROUND OF THE INVENTION

Apparatus of the type described is most notably used for mixing or blending frozen or semi-frozen foods, such as ice cream or ice milk, with fruits, nuts, candies and limitless other ingredients, while simultaneously changing the consistency of the blended food product to a custard-style ice cream. It will be recognized, however, that the apparatus may be used for mixing other food ingredients as well.

The background of such apparatus is typically exemplified by four U.S. patents of which the applicant is aware, all of which patents issued to C. A. Reed.

U.S. Pat. No. 2,409,067 which issued on Oct. 8, 1946 relates to means and method for preparing malted milk shakes and the like. A reciprocally mounted ingredient container is provided and a mixing blade is mounted in sealed engagement therewith for mixing or blending the ingredients.

U.S. Pat. No. 2,626,132 which issued on Jan. 20, 1953 features a conical shaped ingredient container and a conical shaped auger received in the container for mixing the ingredients.

U.S. Pat. No. 2,626,133 which likewise issued on Jan. 20, 1953 specifically addresses the problem of treating a hard frozen product similar to frozen ice cream and mixing same with other ingredients so as to soften and plasticize the mixed product and to make it smooth and creamy, and to otherwise enhance its taste.

U.S. Pat. No. 3,061,279 which issued on Oct. 30, 1962 is an improvement of the then prior art devices in that it provides means for plasticizing, kneading and remixing hardened frozen ingredients in an extrusion vessel which also acts to extrude the product therefrom, but only after thorough conditioning thereof.

While the prior art, teaches conical ingredient containers and conical augers as featured in the present invention, the means for engaging the auger and the container to provide the aforenoted mixing has heretofore been an operator-operable handle or arm arrangement which is cumbersome and has proven to be disadvantageous for various other reasons. Moreover, the several components of the prior art devices have not been easily removable as is desirable for sanitary or cleaning purposes.

Accordingly, it is the object of the present invention to provide apparatus for mixing food ingredients which obviates the aforenoted disadvantages of the prior art apparatus and hence represents a distinct improvement thereover.

SUMMARY OF THE INVENTION

This invention contemplates apparatus for mixing food ingredients including a cabinet and an electric motor disposed therein for driving a conical auger. A conical food ingredient container is supported in a frame. The cabinet is arranged at each of its two opposite sides to accept a vertical member which is longitudinally displaced by a weight arrangement. The vertical members are coupled to the frame so that the frame is displaced therewith.

The frame supports a tray which is displaceable toward an operator to a non-operating position and is displaceable away from the operator to an operating position via springs. The food ingredient container is received in the tray when the tray is in the non-operating position. When the tray is in the operating position the food container in the tray is moved under a removeable plate supported by the frame and having an opening slightly larger than the auger so that the auger can pass therethrough and into the container. The plate serves as a splash retainer to maintain the ingredients inside the container and also to prevent the container from being upwardly displaced when the apparatus is operating. The plate is easily removed as is desireable.

Means are provided for exerting a force on spring loaded rods engaging recesses in the cabinet for maintaining the frame in a lowermost position and for disengaging the rods from the detents so that the frame rises under the force of the weight arrangement and the ingredient container engages the auger, whereupon the apparatus is operated for mixing the ingredients.

DETAILED DESCRIPTION OF THE INVENTION

Figure 1:
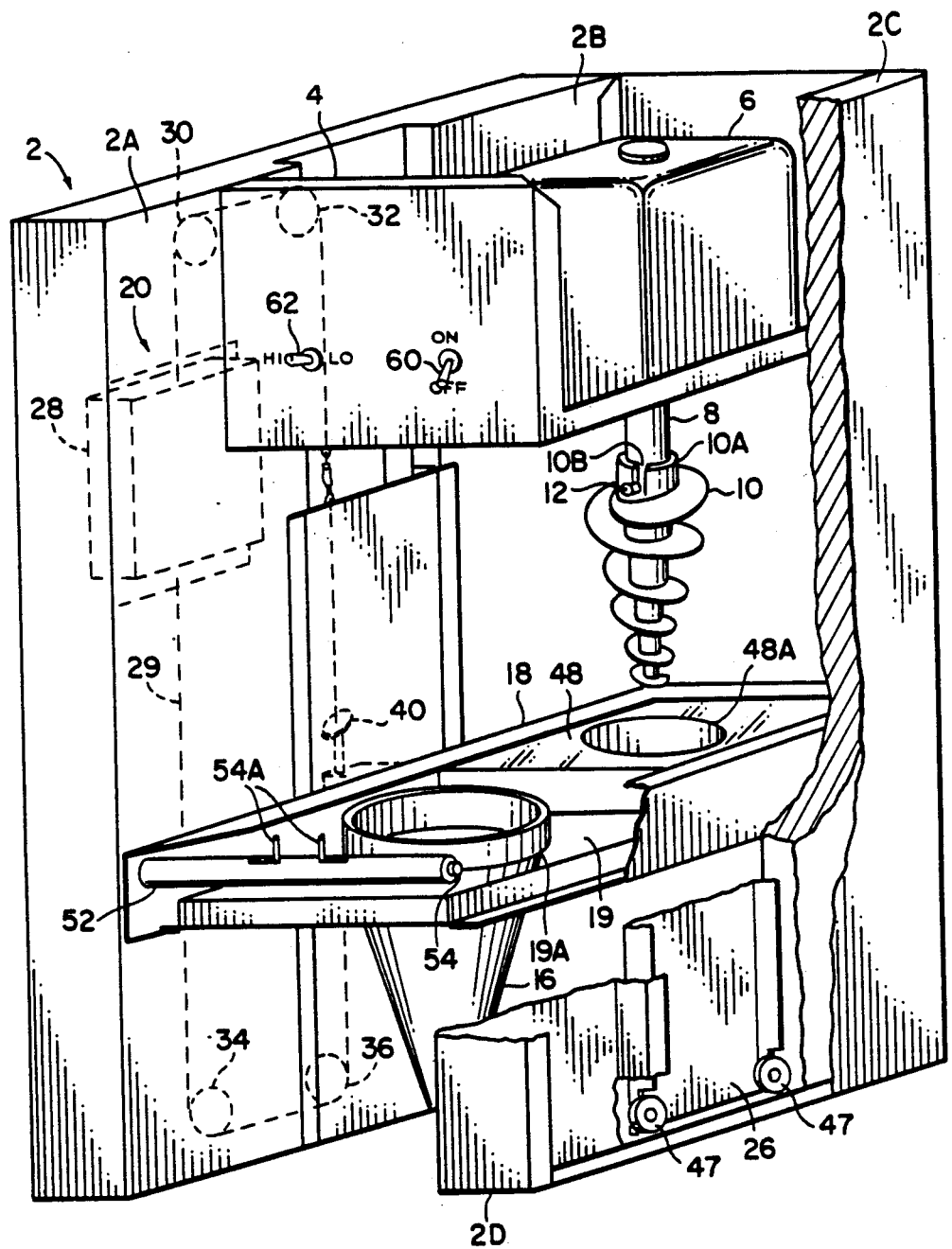
FIG. 1 is a diagrammatic perspective, partially cutaway representation of the apparatus of the invention.

With reference to the drawing, a cabinet is designated generally by the numeral 2. Cabinet 2 includes a pair of side members 2A and 2B and another pair of oppositely disposed side members 2C and 2D in spaced relation with side members 2A and 2B.

A housing or the like 4 is supported within cabinet 2 and an electric motor 6 is mounted within housing 4. Motor 6 has an output shaft 8. A conical auger 10 is coupled to output shaft 8 via a crosspin 12 engaging an L-type slot 10B in hub 10A of auger 10.

A food ingredient container or cone 16 is supported in a frame 18 as will be hereinafter described. Frame 18 is vertically displaceable via a weight arrangement on both sides thereof designated generally by the numeral 20 and shown in phantom in FIG. 1 and in substantial detail in FIG. 2.

Figure 3:
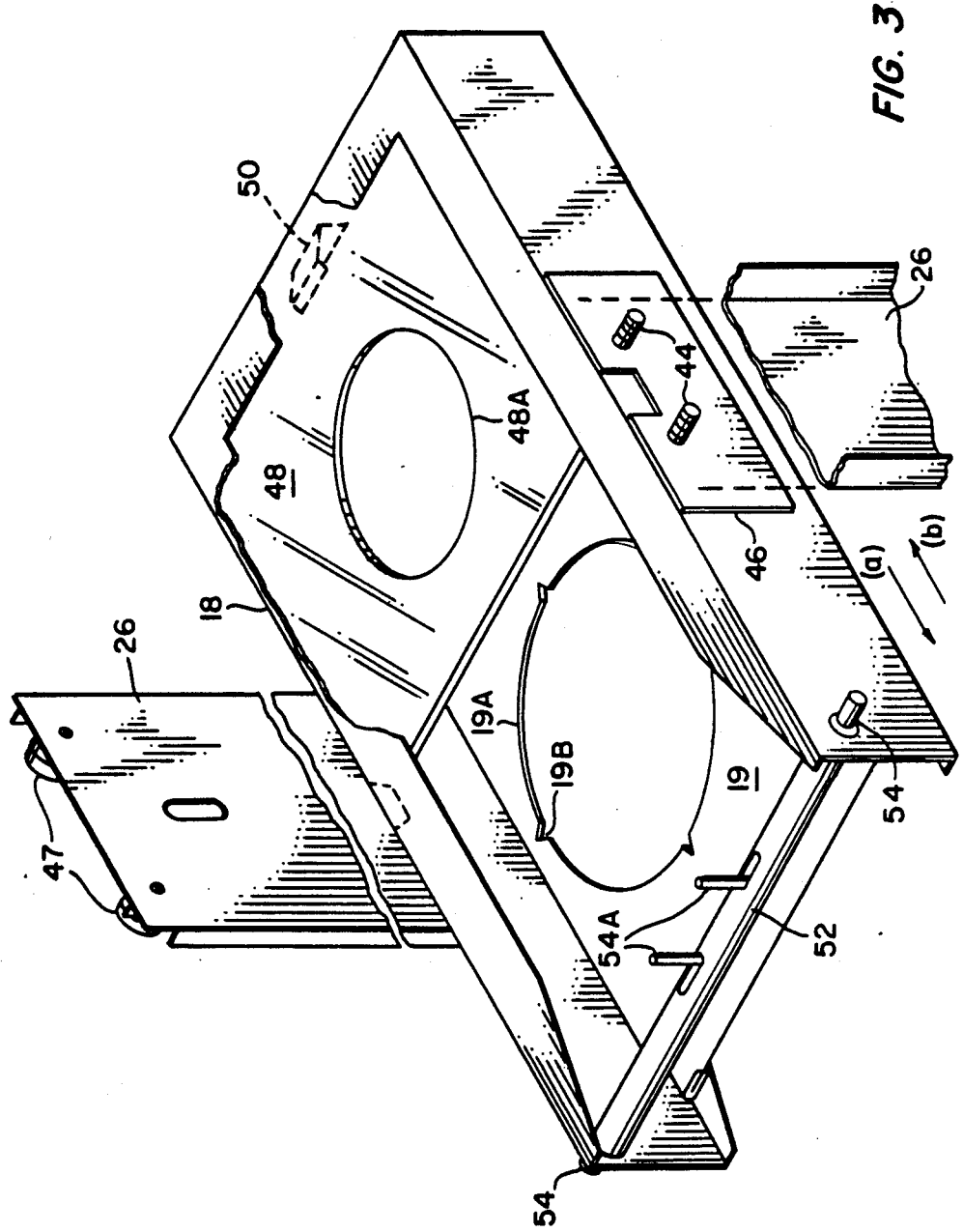
FIG. 3 is a diagrammatic perspective representation particularly showing the tray and frame arrangement of the invention.

Frame 18 which is shown in substantial detail in FIG. 3 movably supports a tray 19. Tray 19 includes a generally circular opening 19A for receiving ingredient container 16. Tray 19 is movable or slideable in the directions of arrows (a) and (b) shown in FIG. 3.

Figure 2:
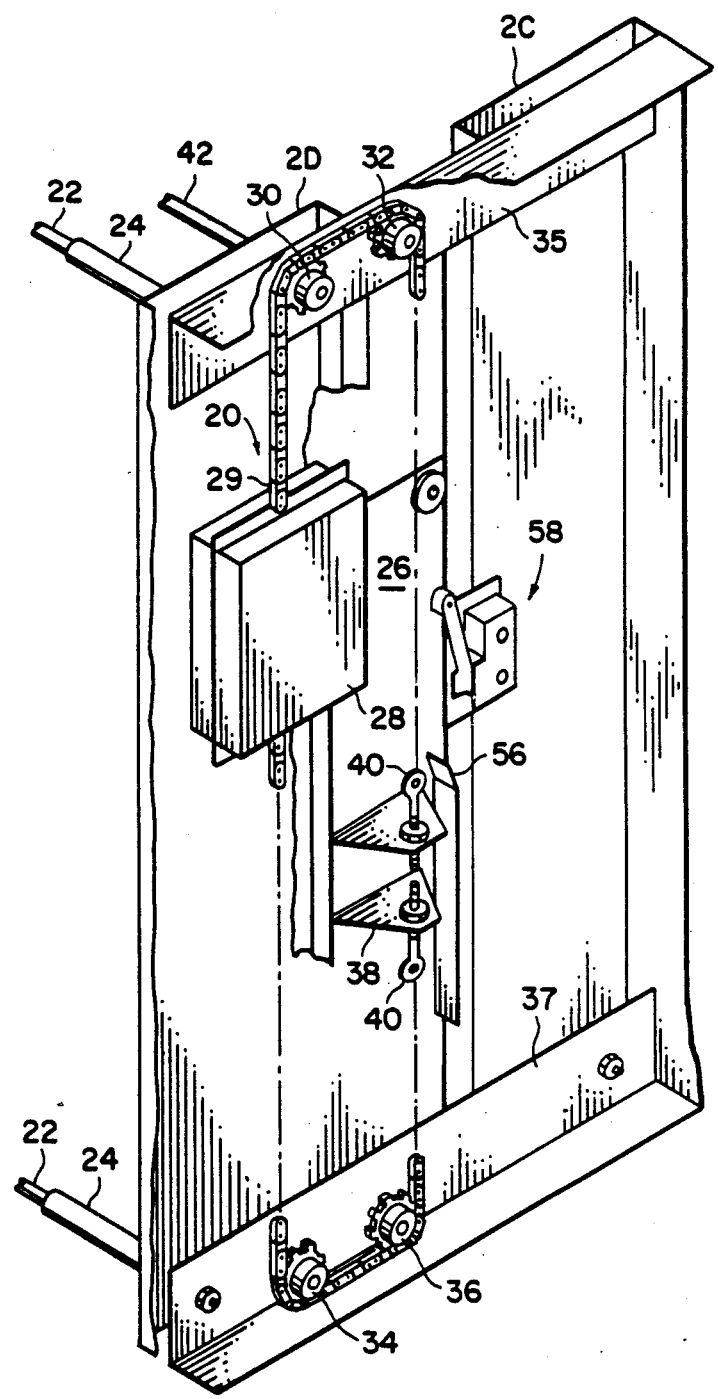
FIG. 2 is a diagrammatic perspective representation of one side of the apparatus of the invention particularly showing the weight arrangement feature thereof, with the other side of the apparatus being of like configuration.

As illustrated in FIG. 2, wherein the right side of cabinet 2 relative to FIG. 1 is shown for purposes of illustration, the cabinet side members are through bolted by bolts 22 and spacers 24 at their corners. The space between each pair of side members is configured to accept a vertical member 26 which is displaceable longitudinally i.e., upward and downward, under the force of weight arrangement 20 as will be hereinafter described.

With continued reference to FIG. 2 weight arrangement 20 includes weights 28 connected to vertical member 26 by a sprocket chain or the like 29. Chain 29 passes over a drive sprocket 30 and an idler sprocket 32 supported by an upper frame bar 35 and passes under a pair of idler sprockets 34 and 36 supported by a lower fram bar 37. It will be understood that the sprockets are disposed so as to provide alignment between weights 28 and vertical member 26.

Chain 29 is connected directly to weights 28, and is connected to a bracket 38 by adjustable screws 40 on the top and bottom of the bracket. Screws 40 are of the type so that proper adjustment of the chain tension can be achieved for the purposes intended. Drive sprocket 30 is mounted to a cross-shaft 42 which maintains the force of weights 28 equal on both sides of frame 18 (FIGS. 1 and 2), as will now be understood. This is necessary so that the longitudinal displacement of the frame is substantially vertical and is not skewed as would be detrimental to the purposes of the invention.

Vertical members 26 are connected to frame 18 by bolts 44 extending through bracket 38 and sandwiching a low friction member 46 to serve as a bearing against cabinet 2 when the vertical members are displaced, as shown in FIG. 3. Vertical members 26 have low friction rollers or wheels 47 mounted thereto on the top and bottom thereof which are in contact with members 2A-2D in the space provided by cabinet 2 (FIGS. 1 and 2).

Frame 18 supports a removable splash plate 48 which may be of plastic or the like. Splash plate 48 carries a generally circular opening 48A for receiving auger 10 in clearance relation.

With specific reference to FIG. 3, movable tray 19 can be manually moved or displaced outwardly in the direction of arrow (a) or towards an operator and retained in said position by a conventional lock pin arrangement (not otherwise shown), and can be displaced or returned to its operating position in the direction of arrow (b) by conventional springs (not otherwise shown). Ingredient cone 16 is disposed in tray opening 19A and includes diametrical lugs (not otherwise shown) engaging appropriate recesses 19B in a conventional manner to prevent rotation of the cone by auger 10 upon operation of the apparatus. Thus, tray 19 in its operating position moves cone 16 under splash plate 48 so that cone 16 in opening 19A is aligned with opening 48A in plate 48. The diameter of opening 48A is slightly larger than the largest diameter of auger 10 so that the auger passes through the hole and into cone 16. Splash plate 48 serves to act as a retainer to keep the food ingredients inside cone 16 and also prevents the cone from rising out of place when the apparatus is operating. Splash plate 48 is easily removed for cleaning by disengaging a clip 50 from frame 18 as will now be understood.

Tray 19 runs on low friction plastic bearings or rollers or the like (not otherwise shown). A manual force is exerted in a downward direction on a hollow crossbar 52 having spring loaded rods 54 engaging corresponding recesses (not otherwise shown) in cabinet 2, whereby frame 18 with cone 16 in hole 19A of tray 19 is maintained in its lowermost position. When actuating members 54A are pushed toward each other, spring loaded rods 54 are released from the detents so that frame 20 and hence cone 16 are displaced upward by the action of weight arrangement 20 so that cone 16 receives auger 10, whereby actuation of the auger for rotation thereof provides blending of the ingredients in cone 16.

In this connection it will be understood that when rods 54 are released from their corresponding detents causing upward displacement as aforenoted, a guide-arm 56 activates a switch 58 as shown in FIG. 2 upon a predetermined displacement being achieved. Switch 58, in turn, activates motor 6 for rotating auger 10 when a switch 60 shown in FIG. 1 is in the "on" position. Switch 60 may have "high" and "low" positions via a toggle 62 also shown in FIG. 1 so that auger 10 is rotated at high and low speeds as is desirable.

Various features may be incorporated into the apparatus of the invention which have not been specifically shown or described herein. For example, cabinet 2 can rest on legs and a transparent, sliding front shield may be incorporated into the cabinet. Likewise, the mechanism of the apparatus may be enclosed by suitable side and top covers as will now be understood. Similarly, splash retainers or the like of a suitable plastic material may be appropriately disposed around the apparatus to inhibit splashing of the food ingredients when the apparatus is operating, as may be desirable.

With the aforegoing description of the invention in mind reference is had to the claims appended hereto for a definition of the scope of the invention.

What is claimed is:

1. Apparatus for mixing food ingredients, characterized by:
   a cabinet having at least two opposite sides in spaced relation;
   driving means supported within the cabinet;
   mixing means coupled to the driving means for being driven thereby;
   a frame disposed between the two cabinet sides and arranged for being longitudinally displaceable relative thereto;
   a plate supported by the frame and including a through opening for receiving the mixing means in clearance relation;
   a tray carried by the frame and arranged for displacement away from and toward and under the plate, and including an opening;
   a food ingredient container disposed in the tray opening, and the tray being displaced toward and under the plate so that the ingredient container is aligned with the mixing means;
   means arranged with the frame and the cabinet sides and actuable for maintaining the frame in a lowermost position, and for releasing the frame from said position; and
   means including a weight arrangement for longitudinally displacing the frame upward when said frame is released from the lowermost position, whereupon the mixing means extends through the plate opening and into the container.

2. Apparatus as described by claim 1, wherein the frame includes one side near one of the cabinet sides and another side near the other of the cabinet sides, and the means including a weight arrangement for longitudinally displacing the frame upward is characterized by:
   a first longitudinally displaceable, substantially vertical member coupled to the one frame side;
   a second longitudinally displaceable, substantially vertical member coupled to the other frame side;
   the means including a weight arrangement having first weight means coupled to the first vertical member and second weight means coupled to the second vertical member; and
   said first and second weight means cooperating for longitudinally displacing the respective first and second vertical members and the frame coupled thereto upward when said frame is released from the lowermost position.

3. Apparatus as described by claim 2, further characterized by:
a relatively low friction member disposed between each of the first and second vertical members and the corresponding frame side.

4. Apparatus as described by claim 2, further characterized by:
means associated with at least one of the first and second vertical members and the corresponding frame side for actuating the driving means for mixing food ingredients in the container when said one vertical member is displaced upward a predetermined distance.

5. Apparatus as described by claim 2, wherein each of the first and second weight means is characterized by:
a drive sprocket and an idler sprocket supported on the upper part of the corresponding frame side;
a pair of idler sprockets supported on the lower part of said frame side;
a bracket mounted to the corresponding vertical member;
a weight configuration; and
a sprocket chain coupled to the weight configuration and passing over the drive sprocket and the idler sprocket and passing under the pair of idler sprockets, and coupled to the bracket.

6. Apparatus described by claim 5, further characterized by:
the drive sprocket and the idler sprocket and the pair of idler sprockets disposed for providing alignment between the weight configuration and the corresponding vertical member.

7. Apparatus as described by claim 5, further characterized by:
a cross-shaft disposed between the two cabinet sides and supported thereby; and
the drive sprockets of the first and second weight means coupled to the cross-shaft for maintaining the force of the weight means equal on both sides of the frame, whereby the longitudinal displacement of the frame is maintained substantially vertical.

8. Apparatus as described by claim 5, further characterized by:
the bracket having a top and a bottom;
first means adjustably coupled to the top of the bracket;
second means adjustably coupled to the bottom of the bracket; and
the sprocket chain having one end coupled to the first means and an opposite end coupled to the second means for adjustment of the chain tension.

9. Apparatus as described by claim 4, further characterized by:
the plate being arranged as a retainer to retain the food ingredients in the container when the driving means is actuated for mixing said food ingredients in the container, and for preventing said container from rising out of place; and
said plate is removably supported by the frame.

* * * * *